United States Patent
Wagner et al.

(10) Patent No.: US 10,983,672 B2
(45) Date of Patent: Apr. 20, 2021

(54) AUGMENTED REALITY MODEL ALIGNMENT

(71) Applicant: Caterpillar Inc., Deerfield, IL (US)

(72) Inventors: James Wagner, Chillicothe, IL (US); Shadi Kfouf, Peoria, IL (US); Scott M. Rose, Washington, IL (US)

(73) Assignee: Caterpilar Inc., Peoria, IL (US)

( * ) Notice: Subject to any disclaimer, the term of this patent is extended or adjusted under 35 U.S.C. 154(b) by 1 day.

(21) Appl. No.: 16/274,033

(22) Filed: Feb. 12, 2019

(65) Prior Publication Data

US 2020/0257412 A1 Aug. 13, 2020

(51) Int. Cl.
*G06F 3/0482* (2013.01)
*G06F 3/01* (2006.01)
*G06T 19/00* (2011.01)

(52) U.S. Cl.
CPC ............ *G06F 3/0482* (2013.01); *G06F 3/011* (2013.01); *G06T 19/006* (2013.01)

(58) Field of Classification Search
CPC ....... G06F 3/0482; G06F 3/011; G06T 19/006
USPC ....................................................... 715/810
See application file for complete search history.

(56) References Cited

U.S. PATENT DOCUMENTS

| | | |
|---|---|---|
| 8,645,220 B2 | 2/2014 | Harper et al. |
| 2012/0327117 A1 | 12/2012 | Weller et al. |
| 2015/0228122 A1* | 8/2015 | Sadasue ................. G06F 3/002 345/633 |
| 2016/0012644 A1 | 1/2016 | Lam |
| 2017/0323062 A1* | 11/2017 | Djajadiningrat ...... G06F 19/324 |
| 2018/0150931 A1 | 3/2018 | Wagner et al. |
| 2018/0336729 A1* | 11/2018 | Prideaux-Ghee ....... G06T 15/06 |

FOREIGN PATENT DOCUMENTS

| | | |
|---|---|---|
| EP | 2908239 A1 | 8/2015 |
| WO | 2014053346 W | 4/2014 |

\* cited by examiner

*Primary Examiner* — Tadesse Hailu
*Assistant Examiner* — Darrin Hope
(74) *Attorney, Agent, or Firm* — Harrity & Harrity LLP

(57) ABSTRACT

A device for augmented reality model alignment is disclosed. The device may receive user input that identifies a machine, identify an augmented reality model associated with the machine, and display a representation of the machine with multiple icons that indicate multiple positions for a target marker. The device may detect a user selection of an icon of the multiple icons and may determine, based on the selected icon, an orientation for superimposition of the augmented reality model. The device may detect the target marker in an image captured by an image capture component of the device and may superimpose the augmented reality model on the image using the orientation.

20 Claims, 6 Drawing Sheets

AUGMENTED REALITY MODEL ALIGNMENT

TECHNICAL FIELD

The present disclosure relates generally to augmented reality and, more particularly, to augmented reality model alignment.

BACKGROUND

Augmented reality is an interactive experience of a real-world environment where objects in the real world are augmented with computer-generated information. For example, computer-generated information (e.g., an image, text, and/or the like) may be superimposed on a digital image of the real world (e.g., while that image is being captured via a camera, a video recorder, and/or the like). However, it may be difficult to properly align and/or orient computer-generated information, particularly a three-dimensional image or model, to superimpose that information appropriately in the digital image (e.g., relative to a real-world object that relates to the computer-generated information).

One attempt to align superimposed information for augmented reality is disclosed in U.S. Patent Application Publication No. 2018/0150931 ("the '931 publication"). In particular, the '931 publication discloses that "The augmented reality application run by the augmented reality processing module may overlay the augmented reality image on the digital image relative to the one or more identified target points in a relationship based on the determined position and orientation of the augmented reality image. The augmented reality image is thereby aligned with the digital image on the interactive display." While there are benefits of using the techniques of the '931 publication, additional or different benefits may be achieved using the techniques of the present disclosure.

SUMMARY

According to some implementations, the present disclosure is related to a method for augmented reality model alignment. The method may include receiving, by a device, user input that identifies a machine; identifying, by the device, an augmented reality model associated with the machine; displaying a representation of the machine with multiple icons that indicate multiple positions for a target marker; detecting, by the device, a user selection of an icon of the multiple icons; determining, by the device and based on the selected icon, an orientation for superimposition of the augmented reality model; detecting, by the device, the target marker in an image captured by an image capture component of the device; and superimposing, by the device, the augmented reality model on the image using the orientation.

According to some implementations, the present disclosure is related to a device for augmented reality model alignment. The device may include memory and one or more processors coupled to the memory. The one or more processors may be configured to receive information that identifies a machine; identify an augmented reality model associated with the machine; detect a user interaction, with a representation of the machine, that identifies a position of a target marker relative to the machine; determine, based on the position, an orientation for superimposition of the augmented reality model; detect the target marker in an image obtained by the device; and superimpose the augmented reality model on the image, wherein the augmented reality model is oriented in the image based on the orientation.

According to some implementations, the present disclosure is related to a non-transitory computer-readable medium storing one or more instructions for augmented reality model alignment. The one or more instructions, when executed by one or more processors of a device, may cause the one or more processors to select a position, from a plurality of positions, for a target marker associated with a machine; determine, based on the position, an orientation for superimposition of an augmented reality model associated with the machine; detect the target marker in an image; and superimpose the augmented reality model on the image based on the orientation.

DETAILED DESCRIPTION

Figure 1:
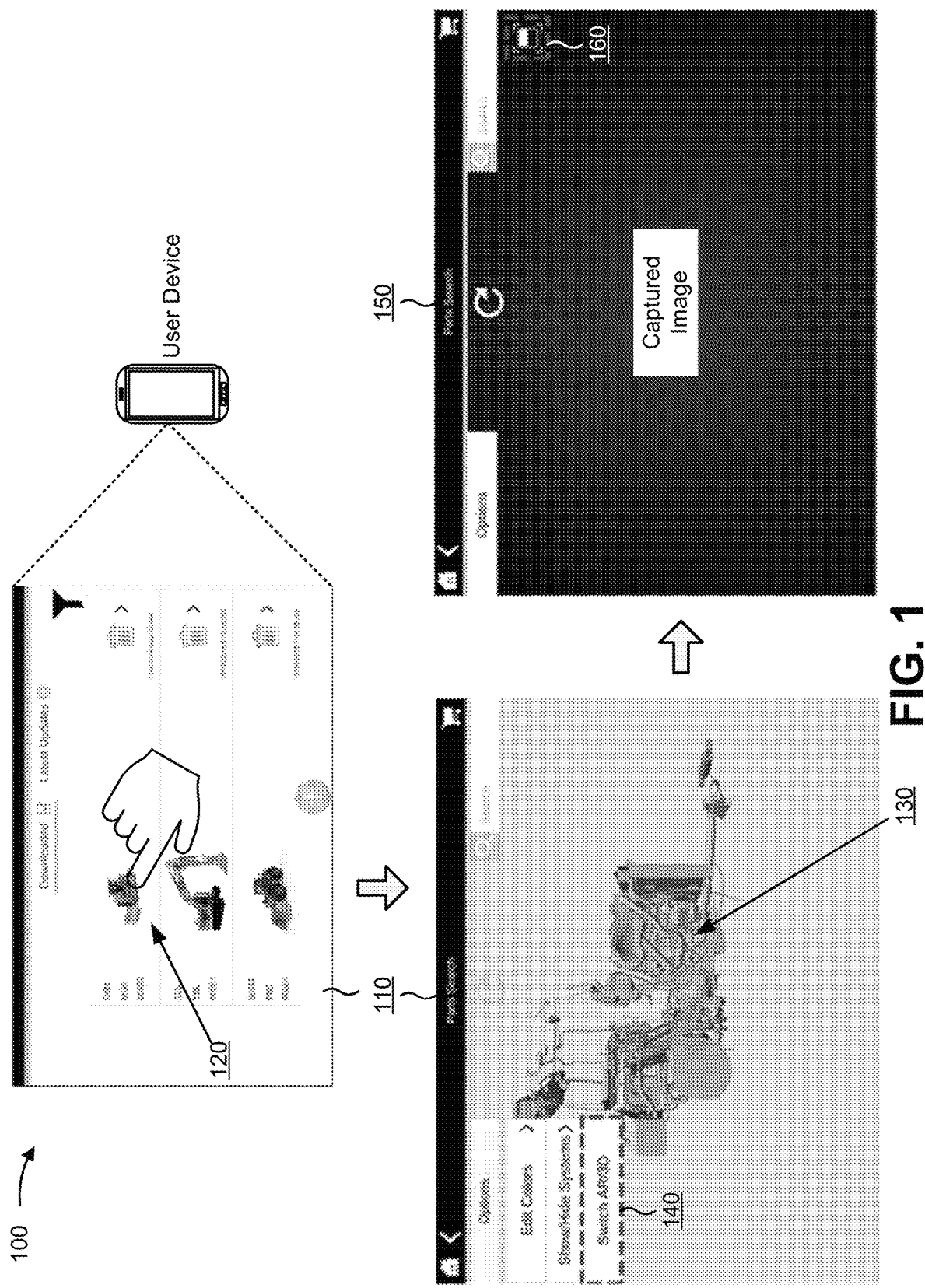
FIGS. 1-3 are diagrams of examples of augmented reality model alignment.
Figure 2:
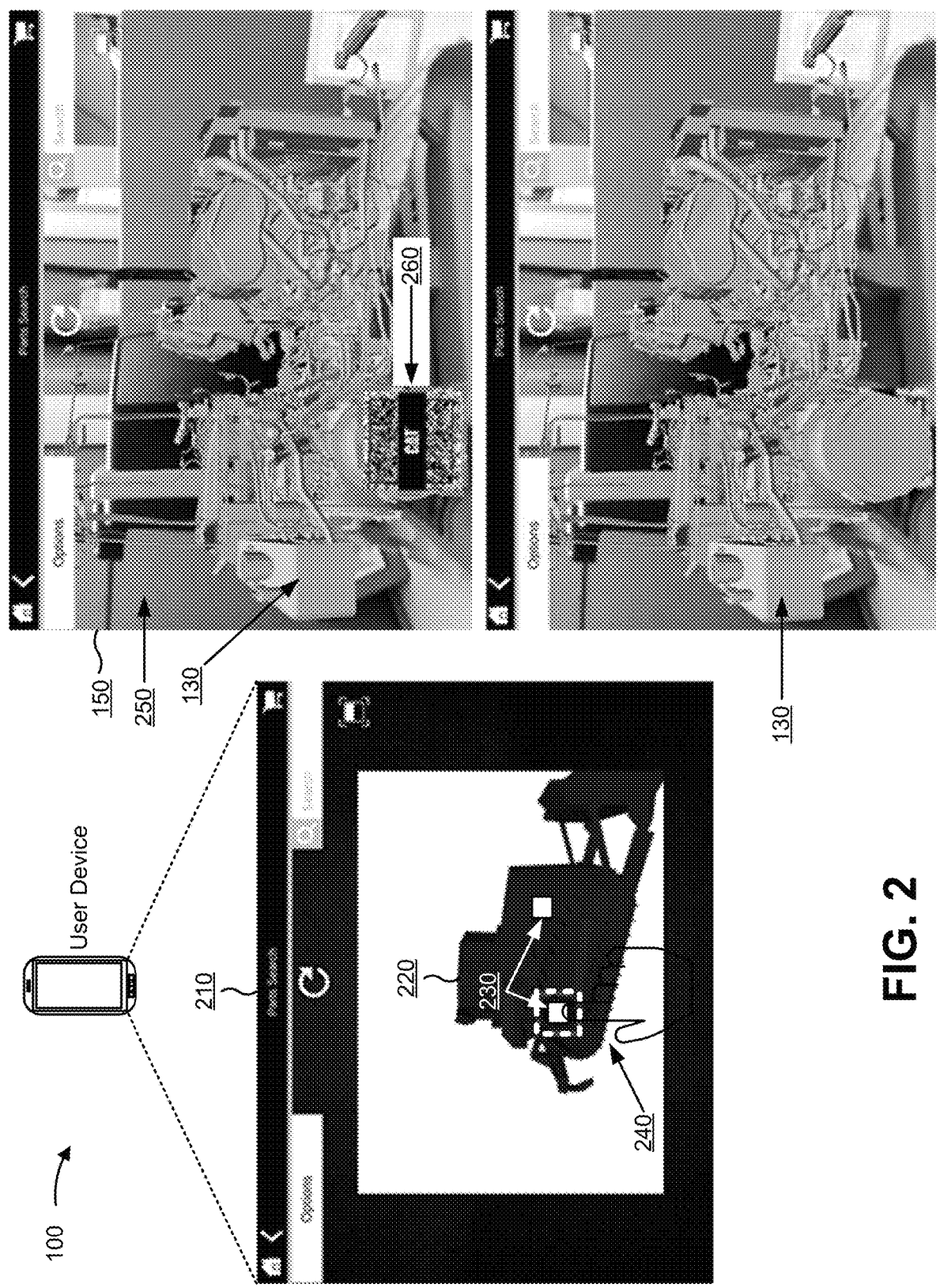
Figure 3:
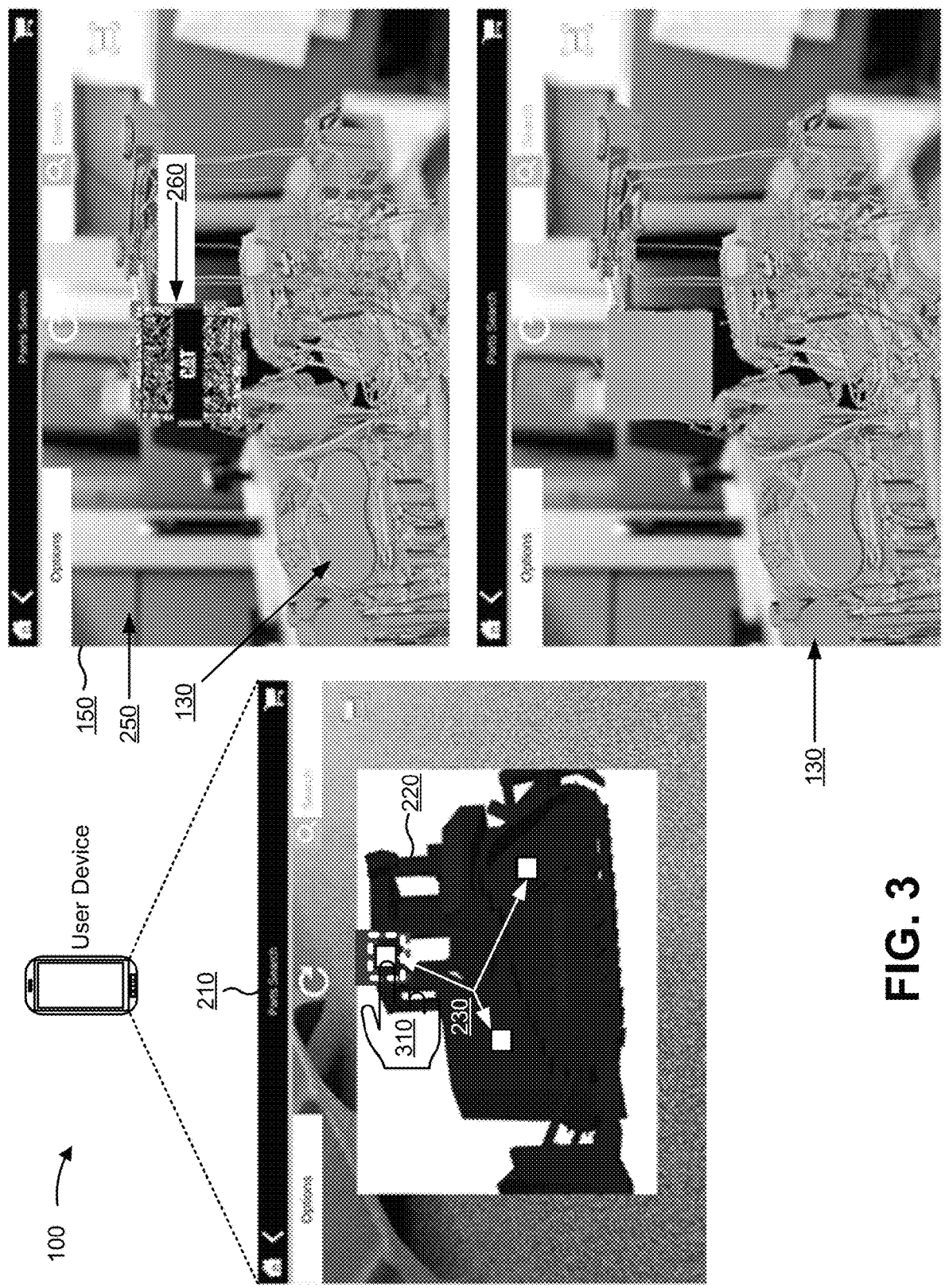

FIGS. 1-3 are diagrams of an example 100 of augmented reality model alignment.

As shown in FIG. 1, a user device (e.g., a tablet computer, a mobile phone, and/or the like) may display a user interface 110 that may be used by a user, such as a machine technician, to assist with diagnosing an issue associated with a machine, inspecting the machine, performing maintenance on the machine, and/or the like. The user interface 110 may be part of an application executing on the user device. As shown, the user interface 110 may display one or more menus, such as a menu that permits the user to select a machine and/or a menu that permits a user to instruct the user device to display an augmented reality user interface, as shown.

As shown by reference number 120, a user may interact with the user interface 110 to provide input that identifies a machine. For example, the user may provide input to identify a type of machine (e.g., a tractor, an excavator, a dozer, and/or the like, as shown) and/or to identify a specific machine (e.g., using a serial number, a vehicle identification number, and/or the like). For example, as shown, the user may interact with an image or icon of a machine to select the machine. The user device may identify a machine in a different manner, such as by comparing an image of a machine, captured by the user device, with images of machines stored in memory (e.g., of the user device or a server device).

As further shown, the user device may identify an augment reality model 130 associated with the machine. The augmented reality model 130 may include a three-dimensional model of the machine and/or components of the machine (e.g., machine parts), such as engine components, transmission components, wires or electrical lines, fluid lines, control systems, hydraulic systems, and/or the like. The user device may be capable of displaying the augmented reality model 130 with multiple orientations. For example, the augmented reality model 130 may be displayed having any possible orientation, and may be rotatable to any other orientation. The user device may identify the augmented reality model 130 using information stored in memory of the user device (e.g., information that indicates a relationship between the machine and the augmented reality model 130 of the machine) and/or by requesting the augmented reality model 130 from a server (e.g., by transmitting information that identifies the machine to the server, and receiving the augmented reality model 130 in a response from the server).

As shown by reference number 140, the user may interact with the user interface 110 to instruct the user device to display an augmented reality user interface 150. The augmented reality user interface 150 may display an image being captured by an image capture component of the user device (e.g., a camera integrated into the user device, a camcorder integrated into the user device, a video recorder integrated into the user device, and/or the like). The augmented reality user interface 150 may also display the augmented reality model 130 superimposed on the captured image, as described in more detail below. As shown by reference number 160, the augmented reality user interface 150 may include an input mechanism (e.g., an icon) that permits the user to instruct the user device to display a target marker selection user interface 210, as described below in connection with FIG. 2.

As shown in FIG. 2, the target marker selection user interface 210 may display a representation 220 of a machine (sometimes referred to as a machine representation) and multiple icons 230. An icon 230 may indicate a position of a real-world target marker relative to the machine (e.g., on the machine, between the machine and the user device, within proximity of the machine, and/or the like). An icon 230 may be associated with an orientation for superimposition of the augmented reality model 130 on an image. The user device may store information that indicates relationships between icons and corresponding orientations for the augmented reality model 130. Thus, different icons 230 may correspond to different positions relative to the machine and/or different orientations for superimposition of the augmented reality model 130 on an image.

The user device may identify a representation 220 to be displayed based on user identification of a machine, as described above in connection with FIG. 1. For example, the user device may identify the representation 220 using information stored in memory of the user device (e.g., information that indicates a relationship between the machine and the representation 220 of the machine) and/or by requesting the representation 220 from a server (e.g., by transmitting information that identifies the machine to the server, and receiving the representation 220 in a response from the server).

The user device may identify a set of reference orientations or a set of permitted target marker positions associated with the machine and/or the augmented reality model 130 of the machine. The user device may display, on the representation 220, an icon 230 corresponding to each reference orientation and/or each set of permitted target marker positions. For example, an icon 230 may be associated with a reference orientation that indicates an orientation with which the augmented reality model 130 is to be displayed. The reference orientation may indicate a reference point and a direction for an x axis, a y axis, and/or a z axis relative to the reference point. The representation 220 may be rotatable via user interaction with the target marker selection user interface 210, and one or more icons 230 may be shown or hidden based on the displayed view of the representation 220 (e.g., icons 230 on a side of the representation 220 being displayed may be shown, and icons 230 on an opposite side not being displayed may be hidden). Additionally, or alternatively, the user device may display a list of possible positions for the target marker, and the user may select an item from the list.

As shown by reference number 240, the user may interact with the target marker selection user interface 210 to select an icon 230 of the multiple icons 230. Selection of the icon 230 may cause the user device to store an indication of an orientation with which the augmented reality model 130 is to be superimposed on an image 250 captured by the user device. For example, the user device may use an icon identifier, associated with the icon, to look up a corresponding orientation identified in a data structure stored by the user device. Additionally, or alternatively, selection of the icon 230 may cause the user device to display the augmented reality user interface 150, which may display the image 250 being captured by the user device.

As further shown, the image 250 may include a target marker 260. For example, the user may place the target marker at a position indicated by the icon 230. The target marker 260 may include a physical marker, such as a magnetic marker, a decal, and/or the like, which may be placed on the machine. Additionally, or alternatively, the target marker 260 may be a recognizable component of the machine (e.g., a machine part, a portion of the machine, and/or the like). The target marker 260 may have a specific shape, may include a specific pattern (e.g., a Quick Response (QR) code, a barcode, and/or the like), may include specific encoded information, may include specific text, and/or the like, that is identifiable by the user device (e.g., an image processor of the user device).

The user may move and/or orient the user device to capture an image 250 of the machine and the target marker 260. The user device may detect the target marker 260 in the image 250, and may superimpose the augmented reality model 130 on the image 250 using the orientation associated with the icon 230 selected by the user. In this way, the augmented reality model 130 may be properly aligned with the real-world machine to assist the user in performing various tasks associated with the machine, as described elsewhere herein.

An orientation of the augmented reality model 130 may include, for example, a rotation of the augmented reality model 130 (e.g., relative to a default rotation). The augmented reality model 130 may be defined by three elements of rotation (e.g., around an x, y, and/or z axis). An orientation of the augmented reality model 130 may be defined by a default orientation and a set of rotations (e.g., around one or more axes). The augmented reality model 130 may be associated with multiple reference orientations, such as one reference orientation for each icon 230 and/or for each position represented by each icon 230. When an icon 230 is selected, the user device may identify a reference orientation that corresponds to the icon 230 (e.g., using a data structure that stores relationships between icon identifiers and corresponding reference orientations of an augmented reality model 130). As described above, the reference orientation may indicate a reference point associated with a selected icon 230 and a direction for an x axis, ay axis, and/or a z axis relative to the reference point. When superimposing the augmented reality model 130 on the image 250, the user device may display the augmented reality model 130 with the reference orientation. For example, the user device may place the augmented reality model 130 by aligning a reference point of the augmented reality model 130 with a reference point associated with the selected icon 230, and orienting the augmented reality model 130 based on the directions of the x axis, they axis, and the z axis associated with the selected icon 230.

The user device may modify a reference orientation based on an angle of the target marker 260 in the image 250 (e.g., an orientation of the target marker 260 in the image 250). For example, the reference orientation may correspond to a default angle of the target marker 260, such as when a face of the target marker 260 is rotated zero degrees in the image 250 (e.g., with no rotation). The user device may determine (e.g., estimate) the relative angle of the target marker 260 relative to a default angle, and may modify the reference orientation based on the relative angle, such as by rotating the reference orientation by an amount equal to the angle, by an amount equal to a proportion of the angle, by an amount determined based on the angle, and/or the like.

Additionally, or alternatively, the user device may determine a position for superimposing the augmented reality model 130 on the image 250. The position may be relative to the target marker 260. For example, the augmented reality model 130 may be represented by a set of points (e.g., pixels, voxels, and/or the like) that are arranged in a particular manner to form the augmented reality model 130. A reference point may refer to a specific point on the augmented reality model 130 (e.g., a specific pixel, a specific voxel, and/or the like). The augmented reality model 130 may be associated with multiple reference points, such as one reference point for each icon 230 and/or for each position represented by each icon 230. When an icon 230 is selected, the user device may identify a reference point that corresponds to the icon 230 (e.g., using a data structure that stores relationships between icon identifiers and corresponding reference points of an augmented reality model 130).

When superimposing the augmented reality model 130 on the image 250, the user device may align the reference point with the target marker 260 (e.g., a point on the target marker 260, such as a center point, a corner point, and/or the like). Although a single reference point is described above as being used for alignment, in some implementations, a set of reference points may be used to align the augmented reality model 130 with the target marker 260 (e.g., a set of points on the target marker 260, such as an outline of the target marker 260, a shape on the target marker 260, and/or the like).

The position and orientation of the augmented reality model 130 in three-dimensional space may be defined by three elements of translation and three elements of rotation, which means that the augmented reality model 130 may have six degrees of freedom.

The user device may determine a size with which the augmented reality model 130 is to be displayed when superimposed on the image 250. The augmented reality model 130 may be associated with a default size (e.g., a default zoom level). Similarly, the target marker 260 may be associated with a default size (e.g., a default size in the captured image 250). The user device may compare a size of the target marker 260 in the image to a default size of the target marker 260, and may adjust the size with which the augmented reality model 130 (e.g., relative to the default size) based on the comparison. Additionally, or alternatively, the user device may estimate a distance between the user device and the target marker 260 (e.g., based on the size of the target marker 260 and a known size of the target marker 260), and may determine a size for displaying the augmented reality model 130 based on the distance.

As shown in FIG. 3, and by reference number 310, user interaction with a different icon 230 (e.g., different from the icon 230 selected as shown in FIG. 2) via the target marker selection user interface 210 may cause the user device to store an indication of a different orientation with which the augmented reality model 130 is to be superimposed on the image 250. Thus, the augmented reality user interface 150 may display an image 250 being captured by the user device and may display the augmented reality model 130 at a different orientation than shown in FIG. 2. For example, when the target marker 260 is detected in the image 250, the user device may superimpose the augmented reality model 130 with an orientation, position, or size that is determined based on the selected icon 230 and/or the target marker 260, as described above. In this way, the user can view the augmented reality model 130 superimposed on an image 250 that includes the machine or a portion of the machine with an orientation, position, and/or size that assists the user with performing one or more tasks associated with the machine.

The user device may validate whether a target marker 260 is correctly placed relative to the machine and/or may determine whether the target marker 260 is misplaced. For example, the user device may determine an expected position of the target marker 260 (e.g., based on selection of an icon 230) and may determine an actual position of the target marker 260 (e.g., based on analyzing the image 250 to determine a position of the target marker 260 relative to one or more components of the machine, an outline of the machine, an edge of the machine, and/or the like). The user device may output a notification that the target marker 260 is misplaced if the actual position differs from the expected position by a threshold amount (e.g., a threshold distance).

Although some operations are described above as being performed by the user device based on a user selection, in some implementations, the selection may be performed by the user device. For example, the user device may select an icon 230 (e.g., may select a position associated with an icon 230) based on a component of the machine that is to be operated on (e.g., inspected, diagnosed, repaired, and/or the like). For example, the user may provide input to the user device indicating a component of the machine (e.g., a part, a system, a subsystem, and/or the like), or the user device may communicate with a communication component of the machine to receive information (e.g., a diagnostics report) that identifies a component of the machine to be inspected and/or repaired. The user device may select an icon 230 and/or a corresponding position based on the component. The user device may select an icon 230 located nearest to the component (e.g., out of all possible icons 230). Additionally, or alternatively, the user device may select an icon 230 based on a data structure that stores relationships between icon identifiers and corresponding machine components (e.g., indicating the best position to be used for superimposition of the augmented reality model 130 to assist with work on the component).

The user device may recommend an icon 230 to be selected by the user (e.g., after user device selection of an icon 230, as described above). Additionally, or alternatively, the user device may notify the user of an icon 230 selected by the user device (e.g., by displaying information that identifies the icon 230 selected by the user device). The user may accept the selection or may override the selection with a user selection. Similarly, the user device may notify the user of a location (e.g., on the machine) where a target marker 260 should be placed by the user.

The user may provide input to add an icon 230 to a representation 220 of the machine to be used in the future. For example, the user may place the target marker 260 on the machine at a position not indicated by an existing (e.g., stored) icon 230. The user may then interact with the user device to modify parameters of the displayed augmented reality model 130, such as an orientation, a position, a size, and/or the like. The user may provide input to save (e.g., store) information that identifies the orientation, the position, and/or the size, and may interact with the representation 220 to select a position on the machine for which an icon 230 is to be created. The user device may then store the position and the parameters of the augmented reality model 130 in association with an icon identifier that identifies the icon 230. The user device may display the created icon 230 for use with the representation 220 in the future. Additionally, or alternatively, the user device may transmit such information to a server to be shared with other user devices.

Although some operations are described above in connection with a single icon 230 and a single target marker 260, in some implementations, multiple icons 230 may be selected, and multiple target markers 260 may be detected in the image 250. The techniques described above may be applied to the multiple target markers 260, such as by determining an orientation, position, size, and/or the like using the multiple target markers 260. In this way, the augmented reality model 130 may be superimposed over the machine with greater accuracy.

As indicated above, FIGS. 1-3 are provided as examples. Other examples may differ from what was described in connection with FIGS. 1-3.

Figure 4:
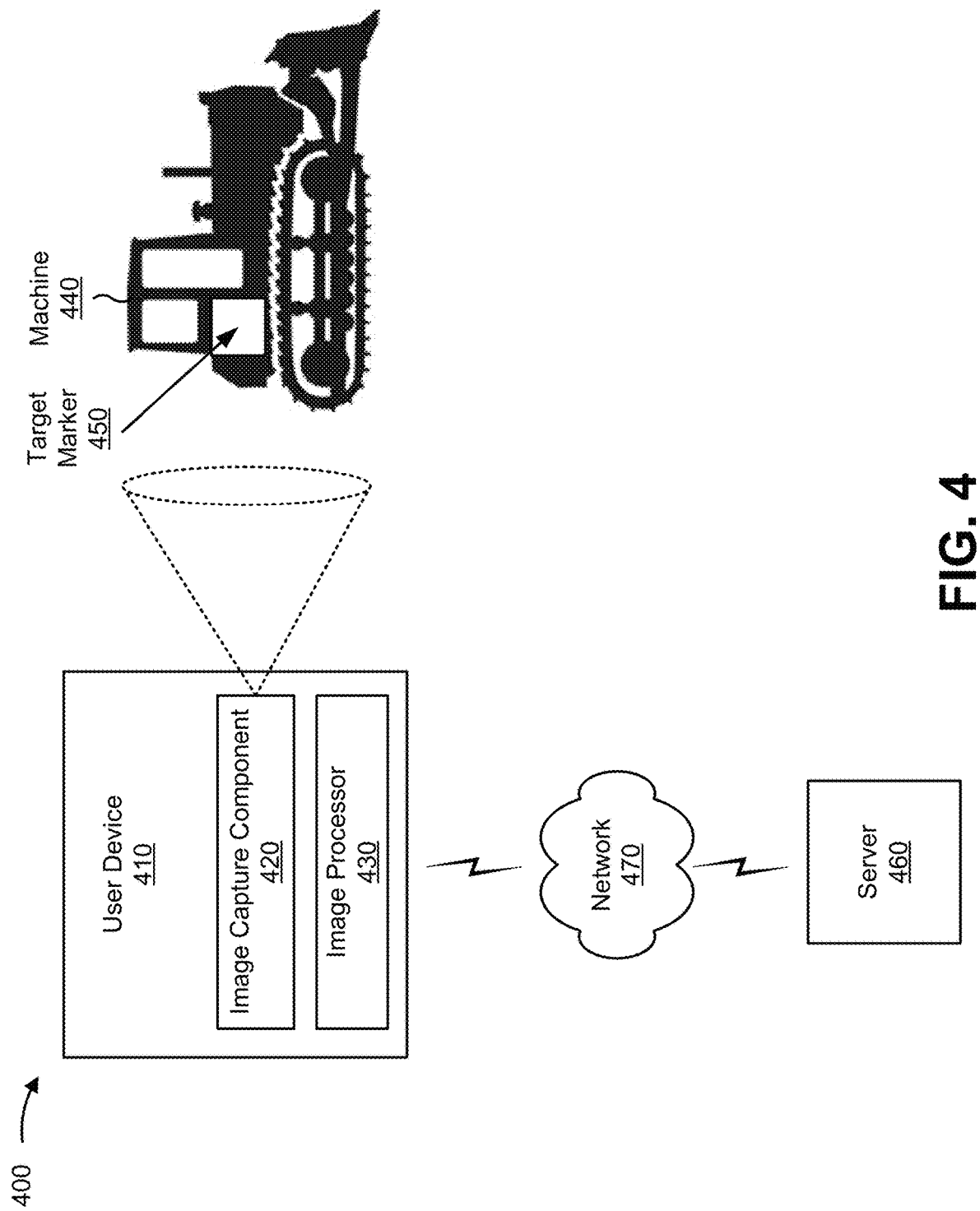
FIG. 4 is a diagram of an example environment in which systems and/or methods, described herein, may be implemented.

FIG. 4 is a diagram of an example environment 400 in which systems and/or methods described herein may be implemented. As shown in FIG. 4, environment 400 may include a user device 410 (which may include an image capture component 420 and an image processor 430), a machine 440, a target marker 450, a server 460, and a network 470. Some devices of environment 400 (e.g., user device 410 and server 460) may interconnect via wired connections, wireless connections, or a combination of wired and wireless connections.

User device 410 includes one or more devices capable of receiving, obtaining, and/or capturing an image, displaying the image, and superimposing augmented reality information (e.g., an augmented reality model) on the displayed image. For example, user device 410 may include a communication and/or computing device, such as a mobile phone (e.g., a smart phone, a radiotelephone, and/or the like), a laptop computer, a tablet computer, a handheld computer, a wearable communication device (e.g., a smart wristwatch, a pair of smart eyeglasses, etc.), or a similar type of device. As shown, user device 410 may include an image capture component 420 and/or an image processor 430.

Image capture component 420 includes one or more devices capable of capturing an image. For example, image capture component 420 may include a camera, a video recorder, a camcorder, and/or the like. Image capture component may capture an image that includes machine 440, a portion of machine 440, and/or target marker 450. Image processor 430 includes one or more devices capable of processing an image, such as by analyzing content of the image, detecting content in the image, and/or the like. For example, image processor 430 may include a processing component, such as processor 520 described in more detail below in connection with FIG. 5. Image processor 430 may be capable of detecting a target marker 450 in an image captured by image capture component 420 and superimposing an augmented reality model on the image, as described elsewhere herein.

Machine 440 may include any machine that performs an operation associated with an industry, such as mining, construction, farming, transportation, or any other industry. As some examples, machine 440 may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Machine 440 may include one or more parts or components capable of failing and which may be diagnosed, inspected, repaired, maintained, and/or the like.

Target marker 450 may include a physical marker (e.g., a magnetic marker, a decal) or a component or part of the machine 440. Target marker 450 may correspond to target marker 260 described above.

Server 460 includes one or more devices capable of receiving, storing, processing, and/or providing information associated with aligning an augmented reality model. For example, server 460 may communicate with user device 410 to transmit or receive an augmented reality model (e.g., associated with machine 440), a representation of machine 440, one or more icons associated with the representation, and/or the like. Server 460 may include a data structure that stores information that indicates relationships between machines, augmented reality models, representations of machines, icons, and/or the like.

Network 470 includes one or more wired and/or wireless networks. For example, network 470 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
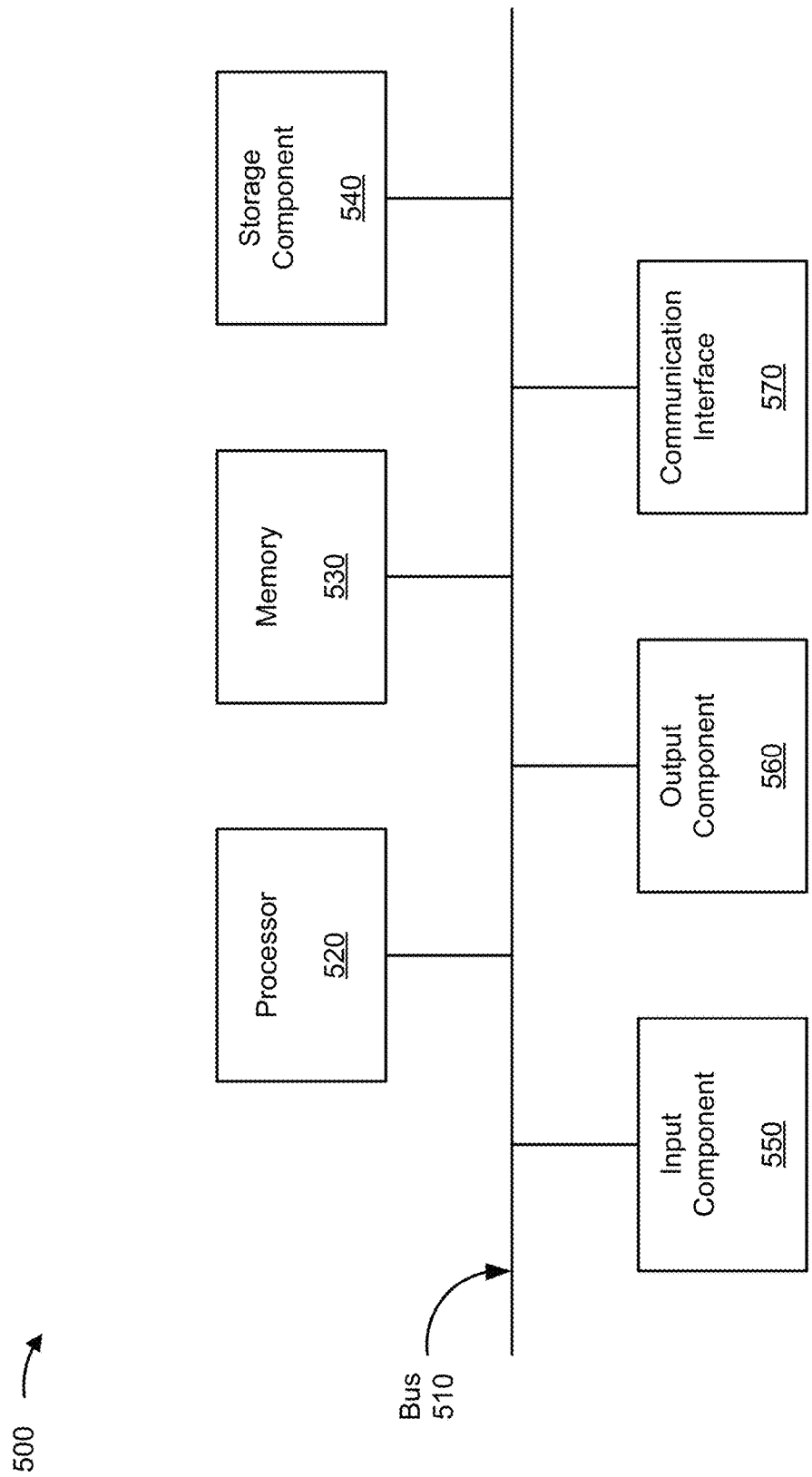
FIG. 5 is a diagram of example components of one or more devices of FIG. 4.

FIG. 5 is a diagram of example components of a device 500. Device 500 may correspond to user device 410, image capture component 420, image processor 430, and/or server 460. In some implementations, user device 410, image capture component 420, image processor 430, and/or server 460 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), a controller, an image processor (e.g., image processor 430), or another type of processing component. In some implementations, processor 520 includes one or more processors capable of being programmed to perform a function. Memory 530 includes a random-access memory (RAM), a read only memory (ROM), and/or another type of dynamic or static storage device that stores information and/or instructions for use by processor 520.

Storage component 540 stores information and/or software related to the operation and use of device 500. For example, storage component 540 may include a hard disk (e.g., a magnetic disk, an optical disk, and/or a magneto-optic disk), a solid-state drive (SSD), and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a component for capturing an image, such as image capture component 420. Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a wireless local area network interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
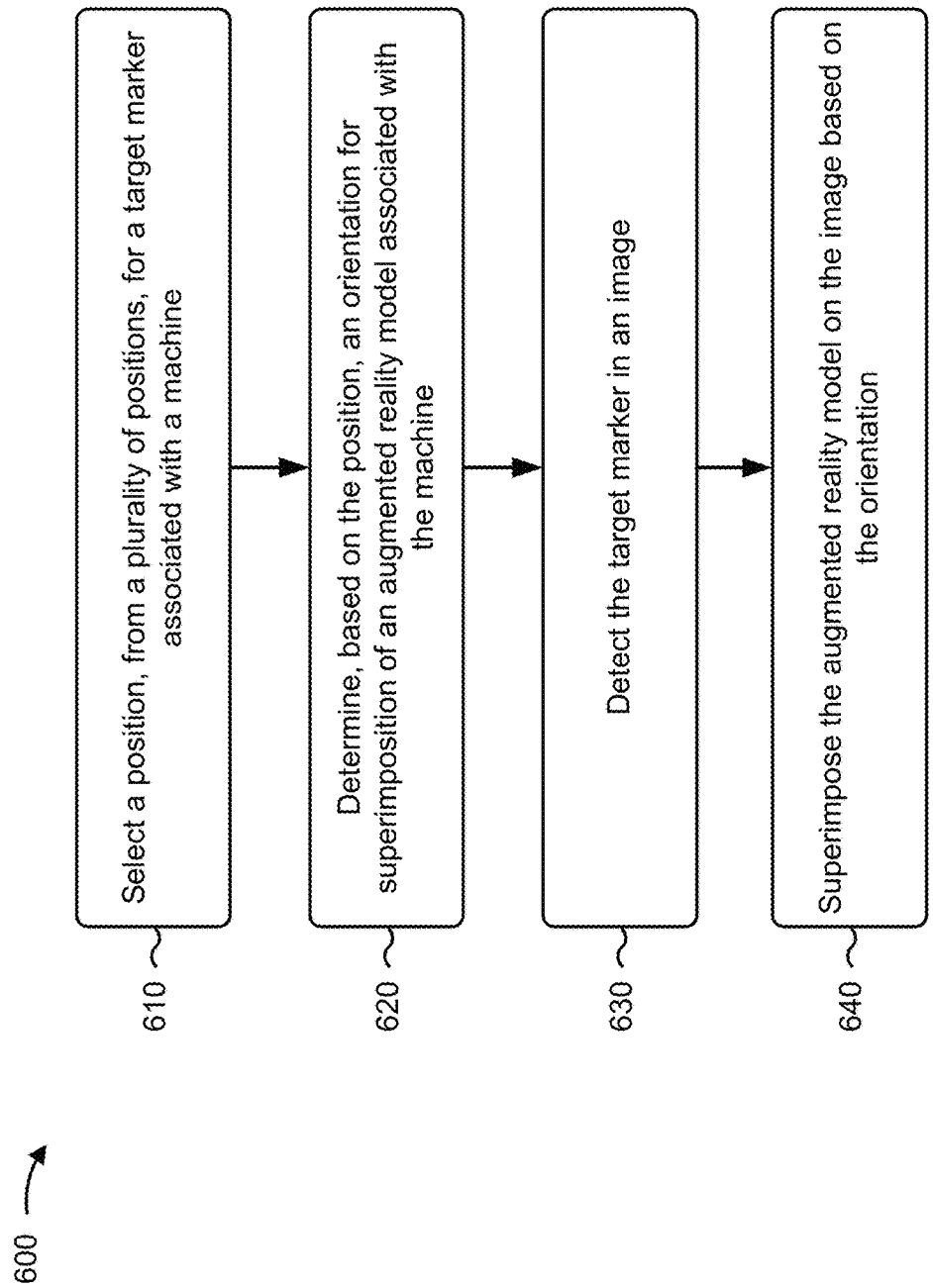
FIG. 6 is a flow chart of an example process for augmented reality model alignment.

FIG. 6 is a flow chart of an example process 600 for augmented reality model alignment. One or more process blocks of FIG. 6 may be performed by a user device (e.g., user device 410). In some implementations, one or more process blocks of FIG. 6 may be performed by another device or a group of devices separate from or including the user device, such as image capture component 420, image processor 430, server 460, and/or the like.

As shown in FIG. 6, process 600 may include selecting a position, from a plurality of positions, for a target marker associated with a machine (block 610). For example, the user device (e.g., using processor 520, input component 550, and/or the like) may select a position, from a plurality of positions, for a target marker associated with a machine, as described above. In some implementations, the position may be determined based on user input. For example, the user device may provide input that identifies the machine, the user device may display a representation of the machine with multiple icons that indicate multiple positions for a target marker (e.g., corresponding to multiple orientations), and the user device may detect a user selection of an icon of the multiple icons. The position may be determined based on the selected icon. Additionally, or alternatively, the position may be determined based on input that identifies a component of the machine (e.g., the nearest position, of the plurality of positions, to the machine).

As further shown in FIG. 6, process 600 may include determining, based on the position, an orientation for superimposition of an augmented reality model associated with the machine (block 620). For example, the user device (e.g., using processor 520, memory 530, and/or the like) may determine an orientation for superimposition of an augmented reality model associated with the machine, as described above. The orientation may be determined based on the position.

As further shown in FIG. 6, process 600 may include detecting the target marker in an image (block 630). For example, the user device (e.g., using image processor 430, processor 520, input component 550, and/or the like) may detect the target marker in an image, as described above. The target marker may include a physical marker placed on the machine, a decal placed on the machine, a component of the machine, and/or the like. The target marker may be located on or within proximity of the machine.

As further shown in FIG. 6, process 600 may include superimposing the augmented reality model on the image based on the orientation (block 640). For example, the device (e.g., using image processor 430, processor 520, output component 560, and/or the like) may superimpose the augmented reality model on the image based on the orientation, as described above.

Process 600 may include additional operations, such as any single operation or any combination of operations described below and/or in connection with one or more other processes described elsewhere herein.

Process 600 may include identifying a reference point of the augmented reality model based on the selected icon and superimposing the augmented reality model on the image based on the reference point (e.g., by aligning the reference point with the target marker in the image). Process 600 may include determining (e.g., estimating) a distance between the device and the target marker and/or the machine and superimposing the augmented reality model on the image based on the distance (e.g., by determining a size with which the augmented reality model is to be displayed based on the distance and displaying the augmented reality model based on the size). Process 600 may include estimating an angle at which the target marker is oriented in the image and superimposing the augmented reality model on the image based on the angle (e.g., by determining the orientation based on the angle). Process 600 may include determining that the target marker is misplaced and outputting a notification that the target marker is misplaced.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

The techniques described herein may use augmented reality to assist a technician with diagnosing an issue of a machine, inspecting a machine, repairing a machine, and/or the like. For example, the technician may be capable of viewing, on a display of the user device, components of the machine that are hidden or located inside the machine (e.g., within a compartment of the machine). If an augmented reality model is accurately superimposed (e.g., with proper orientation, position, size, and/or the like) over an image of the machine being captured by a user device used by the technician, the technician may be able to identify a component more quickly and/or more accurately. Techniques described herein assist with such quick and accurate identification of components by improving the accuracy with which an augmented reality model is oriented, positioned, or sized when superimposed on an image of the machine or a portion of the machine.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, by a device, user input that identifies a machine;
   identifying, by the device, an augmented reality model associated with the machine;
   displaying, by the device, a representation of the machine with multiple icons that indicate multiple positions for a target marker;
   detecting, by the device, a user selection of an icon of the multiple icons;
   determining, by the device, an orientation for superimposition of the augmented reality model based on the user selection of the icon and based on information that indicates relationships between the multiple icons and corresponding orientations for superimposition of the augmented reality model,
   the corresponding orientations including the orientation;
   detecting, by the device, the target marker in an image captured by an image capture component of the device; and
   superimposing, by the device, the augmented reality model on the image using the orientation.

2. The method of claim 1, further comprising:
   identifying a reference point of the augmented reality model based on the selected icon; and
   wherein superimposing the augmented reality model on the image further comprises:
      aligning the reference point with the target marker in the image.

3. The method of claim 1, further comprising:
   estimating a distance between the device and the target marker;
   determining a size with which the augmented reality model is to be displayed based on the distance; and
   wherein superimposing the augmented reality model on the image further comprises:
      displaying the augmented reality model based on the size.

4. The method of claim 1, further comprising:
   estimating an angle at which the target marker is oriented in the image; and
   wherein determining the orientation for superimposition of the augmented reality model comprises:
      determining the orientation based on the angle.

5. The method of claim 1, wherein the representation of the machine is identified based on receiving the user input that identifies the machine.

6. The method of claim 1, wherein the target marker comprises a physical marker placed on the machine.

7. The method of claim 1, wherein the target marker comprises:
   a decal placed on the machine, or
   a component of the machine.

8. The method of claim 1, wherein the orientation includes a rotation of the augmented reality model relative to a default rotation.

9. A device, comprising:
   a memory; and
   one or more processors coupled to the memory, the one or more processors configured to:
      receive information that identifies a machine;
      identify an augmented reality model associated with the machine;
      detect a user interaction, with a representation of the machine, that identifies a selection of an icon of multiple icons for a target marker;
      determine, based on the selection of the icon and based on information that indicates relationships between the multiple icons and corresponding orientations for superimposition of the augmented reality model, an orientation for superimposition of the augmented reality model,
      the corresponding orientations including the orientation;
      detect the target marker in an image obtained by the device; and superimpose the augmented reality model on the image, wherein the augmented reality model is oriented in the image based on the orientation.

10. The device of claim 9, wherein the one or more processors are further configured to:
identify a reference point associated with the augmented reality model; and
wherein the one or more processors, when superimposing the augmented reality model on the image, are further configured to:
superimpose the augmented reality model on the image based on the reference point.

11. The device of claim 9, wherein the one or more processors are further configured to:
determine a distance between the device and at least one of the target marker or the machine; and
wherein the one or more processors, when superimposing the augmented reality model on the image, are further configured to:
superimpose the augmented reality model on the image based on the distance.

12. The device of claim 9, wherein the one or more processors are further configured to:
determine an angle at which the target marker is oriented in the image; and
wherein the one or more processors, when superimposing the augmented reality model on the image, are further configured to:
superimpose the augmented reality model on the image based on the angle.

13. The device of claim 9, wherein the one or more processors are further configured to:
present, for display, the representation of the machine with the multiple icons,
wherein the multiple icons correspond to multiple positions for the target marker.

14. The device of claim 9, wherein the target marker is located on or within proximity of the machine.

15. The device of claim 9, wherein the target marker comprises at least one of:
a physical marker placed on the machine,
a decal placed on the machine, or
an identifiable component of the machine.

16. A non-transitory computer-readable medium storing instructions comprising:
one or more instructions that, when executed by one or more processors of a device, cause the one or more processors to:
provide, for display, a representation of a machine with multiple icons that indicate multiple positions for a target marker;
identify a selection of an icon of the multiple icons;
determine an orientation for superimposition of an augmented reality model associated with the machine based on the selection of the icon and based on information that indicates relationships between the multiple icons and corresponding orientations for superimposition of the augmented reality model,
the corresponding orientations including the orientation;
detect the target marker in an image; and
superimpose the augmented reality model on the image based on the orientation.

17. The non-transitory computer-readable medium of claim 16, wherein the one or more instructions, that cause the one or more processors to identify the selection of the icon, cause the one or more processors to:
receive input that identifies a component of the machine; and
select the icon based on the component.

18. The non-transitory computer-readable medium of claim 17, wherein the icon is, of the multiple icons, is located nearest to the component.

19. The non-transitory computer-readable medium of claim 16, wherein the one or more instructions, when executed by the one or more processors, further cause the one or more processors to:
determine that the target marker is misplaced; and
output a notification that the target marker is misplaced.

20. The non-transitory computer-readable medium of claim 16,
wherein the one or more instructions, that cause the one or more processors to identity the selection of the icon, further cause the one or more processors to:
detect an interaction with the icon; and
identify the selection of the icon based on detecting the interaction with the icon.

* * * * *